Sept. 11, 1923.
W. MERTÉ
TELEPHOTO OBJECTIVE
Filed May 5, 1922
1,467,804
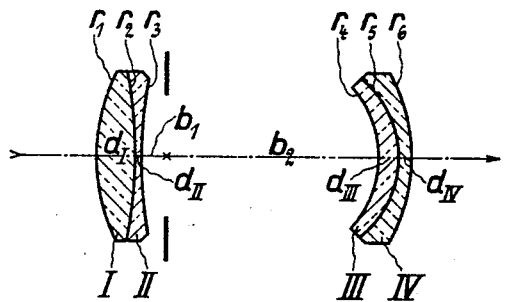
Inventor:
Willy Merté

Patented Sept. 11, 1923.

1,467,804

UNITED STATES PATENT OFFICE.

WILLY MERTÉ, OF JENA, GERMANY, ASSIGNOR TO CARL ZEISS, OF JENA, GERMANY.

TELEPHOTO OBJECTIVE.

Application filed May 5, 1922. Serial No. 558,781.

*To all whom it may concern:*

Be it known that I, WILLY MERTÉ, a citizen of the German Empire, and residing at Jena, Germany, have invented a new and useful Telephoto Objective (for which I have filed an application in Germany May 7, 1921), of which the following is a specification.

The present invention relates to an objective which consists of a front member having collective power and a back member having a dispersive effect, and the hinder principal point of which lies in front of the foremost lens surface, in which manner, therefore, (as is the rule in so-called telephoto objectives) the distance from the said lens surface to the focal plane of the objective is smaller than the focal length of the objective.

The invention affords the possibility of constructing telephoto objectives, which are endowed with comparatively great light-gathering power and yield a comparatively large field of view, the spherical, the chromatical, and especially the astigmatical aberrations being, in addition corrected to such an extent as hitherto in general not obtainable in telephoto objectives, if each of the two members be composed of two lenses cemented together, having the opposite sign of refractive power, and if the two components of the rear member be menisci, the concave surface of which faces the front member, whilst the cemented surface of the front member is dispersive and the cemented surface of the rear member collective.

The annexed drawing shows a constructional example in a section.

In the subjoined tables are enumerated the dimensions and the numerical values, characterizing the different kinds of glass used, for the constructional example shown in the annexed drawing and intended to be used at a largest relative aperture of 1:5, 5. The dimensions indicated below apply to a focal length of 100 units.

| Radii. | Thicknesses and distances. |
|---|---|
| $r_1 = +18,98$ | $d_\mathrm{I} = 3,88$ |
| $r_2 = -45,01$ | $d_\mathrm{II} = 0,61$ |
| $r_3 = +43,41$ | $b_1 = 2,53$ |
| $r_4 = -10,61$ | $b_2 = 21,03$ |
| $r_5 = -10,34$ | $d_\mathrm{III} = 2,04$ |
| $r_6 = -17,56$ | $d_\mathrm{IV} = 1,22$ |

Kinds of glass.

| | I | II | III | IV |
|---|---|---|---|---|
| $n_D$ | 1,5913 | 1,6042 | 1,6238 | 1,4979 |
| $v$ | 61,0 | 37,9 | 35,7 | 65,3 |

I claim:

Spherically, chromatically and astigmatically corrected objective consisting of a collective front member and a dispersive back member, the hinder principal point lying in front of the foremost lens surface, each member being composed of two components of opposite sign cemented together, the components of the back member being menisci, turning their concave surfaces towards the front member, and the cemented surface of the front member being dispersive, while the cemented surface of the back member is collective.

WILLY MERTÉ.

Witnesses:
 PAUL KRÜGER,
 FRITZ SANDER.